US012739933B2

(12) United States Patent
Zhang et al.

(10) Patent No.: US 12,739,933 B2
(45) Date of Patent: Sep. 15, 2026

(54) METHOD AND DEVICE USED FOR DISCONTINUOUS RECEPTION IN WIRELESS COMMUNICATION

(71) Applicant: Apogee 5G Global, LLC, Plano, TX (US)

(72) Inventors: Jinfang Zhang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 431 days.

(21) Appl. No.: 18/218,012

(22) Filed: Jul. 4, 2023

(65) Prior Publication Data

US 2024/0015839 A1 Jan. 11, 2024

(30) Foreign Application Priority Data

Jul. 8, 2022 (CN) ........................ 202210805395.7

(51) Int. Cl.

| | |
|---|---|
| ***H04W 76/28*** | (2018.01) |
| ***H04W 52/02*** | (2009.01) |
| ***H04W 76/38*** | (2018.01) |

(52) U.S. Cl.

CPC ....... *H04W 76/28* (2018.02); *H04W 52/0235* (2013.01); *H04W 76/38* (2018.02)

(58) Field of Classification Search

None

See application file for complete search history.

(56) References Cited

U.S. PATENT DOCUMENTS

| | | | | |
|---|---|---|---|---|
| 12,317,230 | B2 | 5/2025 | Zhang | |
| 12,647,942 | B2 | 6/2026 | Zhang | |
| 2015/0351151 | A1* | 12/2015 | Huang | H04W 36/0085 370/252 |
| 2021/0259044 | A1* | 8/2021 | Islam | H04W 72/535 |

(Continued)

FOREIGN PATENT DOCUMENTS

| | | |
|---|---|---|
| CN | 113365223 A | 9/2021 |
| WO | 2021175256 A1 | 9/2021 |

OTHER PUBLICATIONS

Third Generation Partnership Project, "Technical Specification Group Radio Access Network; NR; Multiplexing and channel coding (Release 17)," 3GPP TS 38.212 V17.2.0 (Jun. 2022).

(Continued)

*Primary Examiner* — Diane L Lo

(74) *Attorney, Agent, or Firm* — Volpe Koenig

(57) ABSTRACT

The present application discloses a method and a device for DRX in wireless communications. A first node receives a first signaling and a first bit block, the first signaling being used for scheduling the first bit block; and maintains a first timer; and as a response to receiving the first signaling, starts or restarts a second timer; and when either of the first timer and the second timer is in a running state, monitors a first-type target signaling; herein, the first timer and the second timer are configured for a same DRX group; the action of maintaining a first timer comprises adjusting the time while the first timer is running; when each condition in a first condition set is satisfied, the reception of the first bit block is used for adjusting the time while the first timer is running. The present application supports DRX running in an effective manner.

20 Claims, 5 Drawing Sheets

(56) References Cited

U.S. PATENT DOCUMENTS

| | | | | |
|---|---|---|---|---|
| 2021/0392622 | A1 | 12/2021 | Zhang | |
| 2022/0248331 | A1* | 8/2022 | Jia | H04W 76/28 |
| 2025/0331058 | A1* | 10/2025 | Ma | H04W 76/28 |

OTHER PUBLICATIONS

Third Generation Partnership Project, "Technical Specification Group Radio Access Network; NR; Physical layer procedures for data (Release 17)," 3GPP TS 38.214 V17.2.0 (Jun. 2022).

Third Generation Partnership Project, "Technical Specification Group Radio Access Network; NR; Medium Access Control (MAC) protocol specification (Release 17)," 3GPP TS 38.321 V17.0.0 (Mar. 2022).

* cited by examiner

5GS/EPS 200
HSS/UDM 220
NR-RAN 202
MME/AMF/SMF 211
other MMEs/AMFs/SMFs 214
UE 201
NR NodeB 203
S-GW/UPF 212
P-GW/UPF 213
Internet service 230
other NR Nodes B 204
5GC/EPC 210

Case A

Case B

Case A

Case B

METHOD AND DEVICE USED FOR DISCONTINUOUS RECEPTION IN WIRELESS COMMUNICATION

CROSS REFERENCE TO RELATED APPLICATIONS

This application claims the priority benefit of Chinese Patent Application No. 202210805395.7, filed on Jul. 8, 2022, the full disclosure of which is incorporated herein by reference.

BACKGROUND

Technical Field

The present application relates to methods and devices in wireless communication systems, and in particular to a method and device supporting Discontinuous Reception in wireless communications.

Related Art

Discontinuous Reception (DRX) is a method commonly used in cellular communications for reducing the power consumption of a User Equipment (UE) and enhancing the standby time. A base station configures parameters of a DRX-related timer through Radio Resource Control (RRC), and controls the running of the DRX-related timer through Downlink Control Information (DCI) or a Medium Access Control (MAC) Control Element (CE), which in turn controls whether the UE is to perform wireless reception in a given slot or subframe.

With increasing diversity of application scenarios in future wireless communication systems, traffics like Virtual Reality (VR) and Extended Reality (XR) will be important traffics in the future wireless communications. These traffics are featured by multi-stream, large jitter of data arrival time, and variable packet size; therefore, it was decided at the 3rd Generation Partner Project (3GPP) Radio Access Network (RAN) #95e Plenary that a Study Item (SI) should be started to standardize XR Enhancement, including firstly beginning studies of the traffic properties in Service and System Aspects (SA) and making a simulation evaluation for the traffic properties in RANI.

SUMMARY

Inventors find through researches that by means of the running of a DRX-related timer a UE can be controlled to receive periodically, and the periodic reception is suitable to periodic traffics or traffics insensitive to delay; but for those sensitive to delay and with large jittering upon data arrivals, since the time of waiting for transmission resulting from data arrival-based jittering is so long that a large amount of packet loss will be caused, which will affect the quality of traffics and user experience.

To address the above issue, the present application discloses a solution to adjusting the running of a DRX-related timer according to received data, which can effectively adapt to the request for transmissions with data changes, thus reducing packet loss and the UE's power consumption. In the case of no conflict, the embodiments of a first node and the characteristics in the embodiments may be applied to a second node, and vice versa. What's more, the embodiments in the present application and the characteristics in the embodiments can be arbitrarily combined if there is no conflict. Further, though originally targeted at the Uu air interface, the present application also applies to the PC5 interface. Further, the present application is designed targeting terminal-base station scenario, but can be extended to Vehicle-to-Everything (V2X), terminal-relay communications, as well as relay base station communications, where similar technical effects can be achieved. Additionally, the adoption of a unified solution for various scenarios, including but not limited to V2X and terminal-base station communications, contributes to the reduction of hardcore complexity and costs. Particularly, for interpretations of the terminology, nouns, functions and variables (unless otherwise specified) in the present application, refer to definitions given in TS36 series, TS38 series and TS37 series of 3GPP specifications.

The present application provides a method in a first node for wireless communications, comprising:

receiving a first signaling and a first bit block, the first signaling being used for scheduling the first bit block; and maintaining a first timer; and as a response to receiving the first signaling, starting or restarting a second timer;

and when either of the first timer and the second timer is in a running state, monitoring a first-type target signaling;

herein, the first timer and the second timer are configured for a same DRX group; the action of maintaining a first timer comprises adjusting the time while the first timer is running, and whether a reception of the first bit block is used for adjusting the time while the first timer is running is related to contents in the first bit block; when each condition in a first condition set is satisfied, the reception of the first bit block is used for adjusting the time while the first timer is running; the first bit block comprising any data type in a first data type set is a condition in the first condition set, the first data type set comprising at least one data type.

In one embodiment, the above method is applicable to delay-sensitive traffics.

In one embodiment, the above method is applicable to traffics with larger jitters for data arrival.

In one embodiment, the above method determines whether the running time of a first timer is adjusted based on contents in a first bit block, which is supportive to flexible DRX running.

In one embodiment, the above method determines whether the running time of a first timer is adjusted based on contents in a first bit block, which can cut the signaling overhead for the network reconfiguration.

In one embodiment, the above method can effectively reduce the packet loss rate by adjusting the running time of a first timer to adapt to the jittering of data arrival.

In one embodiment, the above method can reduce the UE's power consumption effectively.

In one embodiment, the above method is backward compatible, which means that a unified solution can apply to all cases.

In one embodiment, the first timer and the second timer are both DRX-related timers.

According to one aspect of the present application, comprising:

receiving a second signaling, the second signaling indicating a first identifier set;

herein, each identifier in the first identifier set indicates a data type in the first data type set.

According to one aspect of the present application, comprising:

the phrase of adjusting the time while the first timer is running comprises at least one of adjusting a start time of the first timer or adjusting an expiration value of the first timer.

According to one aspect of the present application, comprising:

whether a reception of the first bit block is used for adjusting the time while the first timer is running is related to a time for receiving the first bit block;

herein, the time for receiving the first bit block belonging to one of an M-th time period or a Q-th time period in a super-time period is one condition in the first condition set; the super-time period comprises Q time periods, where the first M time period(s) among the Q time periods has/have an identical duration, which is different from duration(s) of the other Q-M time period(s) among the Q time periods; the first timer runs once per time period in a super-time period.

In one embodiment, the above method makes an effective adaptation to a non-integer periodicity of data arrival via a super-time period.

In one embodiment, the above method can effectively reduce the packet loss rate by determining whether to adjust the running time of the first timer according to both contents in a first bit block and a time for receiving the first bit block.

According to one aspect of the present application, comprising:

whether a reception of the first bit block is used for adjusting the time while the first timer is running is related to a time for receiving the first bit block;

herein, a time interval from the time for receiving the first bit block to a start time of the first timer in a second time period being larger than a first threshold is one condition in the first condition set.

In one embodiment, by determining whether to adjust the running time of the first timer according to both contents in a first bit block and a time for receiving the first bit block, the above method can effectively adapts the jittering of data arrival, which is beneficial to reducing the packet loss rate.

According to one aspect of the present application, comprising:

the action of maintaining a first timer comprises starting the first timer at a first time in a first time period and starting the first timer at a second time in the second time period;

herein, when the reception of the first bit block is used for adjusting the time while the first timer is running, at least one of adjusting a position of the first time in the first time period to where is different from a position of the second time in the second time period or adjusting a first expiration value to what is different from a second expiration value is done; the first expiration value is an expiration value of the first timer in the first time period; the second expiration value is an expiration value of the first timer in the second time period; the second time period is a latest time period before the first time period.

According to one aspect of the present application, comprising:

the first timer is a drx-ondurationtimer, while the second timer is a drx-inactivitytimer.

The present application provides a method in a second node for wireless communications, comprising:

transmitting a first signaling and a first bit block, the first signaling being used for scheduling the first bit block;

herein, a first timer is maintained; a reception of the first signaling is used for starting or restarting a second timer; when any of the first timer or the second timer is in a running state, a first-type target signaling is being monitored; the first timer and the second timer are configured for a same DRX group; the first timer being maintained comprises the time while the first timer is running being adjusted, and whether a reception of the first bit block is used for adjusting the time while the first timer is running is related to contents in the first bit block; when each condition in a first condition set is satisfied, the reception of the first bit block is used for adjusting the time while the first timer is running; the first bit block comprising any data type in a first data type set is a condition in the first condition set, the first data type set comprising at least one data type; the first timer and the second timer are respectively maintained by a receiver of the first signaling.

According to one aspect of the present application, comprising:

transmitting a second signaling, the second signaling indicating a first identifier set;

herein, each identifier in the first identifier set indicates a data type in the first data type set.

According to one aspect of the present application, comprising:

the phrase of the time while the first timer is running being adjusted comprises at least one of a start time of the first timer being adjusted or an expiration value of the first timer being adjusted.

According to one aspect of the present application, comprising:

whether a reception of the first bit block is used for adjusting the time while the first timer is running is related to a time for receiving the first bit block;

herein, the time for receiving the first bit block belonging to one of an M-th time period or a Q-th time period in a super-time period is one condition in the first condition set; the super-time period comprises Q time periods, where the first M time period(s) among the Q time periods has/have an identical duration, which is different from duration(s) of the other Q-M time period(s) among the Q time periods; the first timer runs once per time period in a super-time period.

According to one aspect of the present application, comprising:

whether a reception of the first bit block is used for adjusting the time while the first timer is running is related to a time for receiving the first bit block;

herein, a time interval from the time for receiving the first bit block to a start time of the first timer in a second time period being larger than a first threshold is one condition in the first condition set.

According to one aspect of the present application, comprising:

the first timer being maintained comprises that the first timer is started at a first time in a first time period and that the first timer is started at a second time in the second time period;

herein, when the reception of the first bit block is used for adjusting the time while the first timer is running, at least one of a position of the first time in the first time period being adjusted to where is different from a position of the second time in the second time period or a first expiration value being adjusted to what is different from a second expiration value is done; the first expiration value is an expiration value of the first timer in the first time period; the second expiration value is an expiration value of the first timer in the second time period; the second time period is a latest time period before the first time period.

According to one aspect of the present application, comprising:

the first timer is a drx-ondurationtimer, while the second timer is a drx-inactivitytimer.

The present application provides a first node for wireless communications, comprising:

a first receiver, receiving a first signaling and a first bit block, the first signaling being used for scheduling the first bit block; and a first processor, maintaining a first timer; and as a response to receiving the first signaling, starting or restarting a second timer; and when either of the first timer and the second timer is in a running state, monitoring a first-type target signaling;

herein, the first timer and the second timer are configured for a same DRX group; the action of maintaining a first timer comprises adjusting the time while the first timer is running, and whether a reception of the first bit block is used for adjusting the time while the first timer is running is related to contents in the first bit block; when each condition in a first condition set is satisfied, the reception of the first bit block is used for adjusting the time while the first timer is running; the first bit block comprising any data type in a first data type set is a condition in the first condition set, the first data type set comprising at least one data type.

The present application provides a second node for wireless communications, comprising:

a first transmitter, transmitting a first signaling and a first bit block, the first signaling being used for scheduling the first bit block;

herein, a first timer is maintained; a reception of the first signaling is used for starting or restarting a second timer; when any of the first timer or the second timer is in a running state, a first-type target signaling is being monitored; the first timer and the second timer are configured for a same DRX group; the first timer being maintained comprises the time while the first timer is running being adjusted, and whether a reception of the first bit block is used for adjusting the time while the first timer is running is related to contents in the first bit block; when each condition in a first condition set is satisfied, the reception of the first bit block is used for adjusting the time while the first timer is running; the first bit block comprising any data type in a first data type set is a condition in the first condition set, the first data type set comprising at least one data type; the first timer and the second timer are respectively maintained by a receiver of the first signaling.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figures 1, 2:
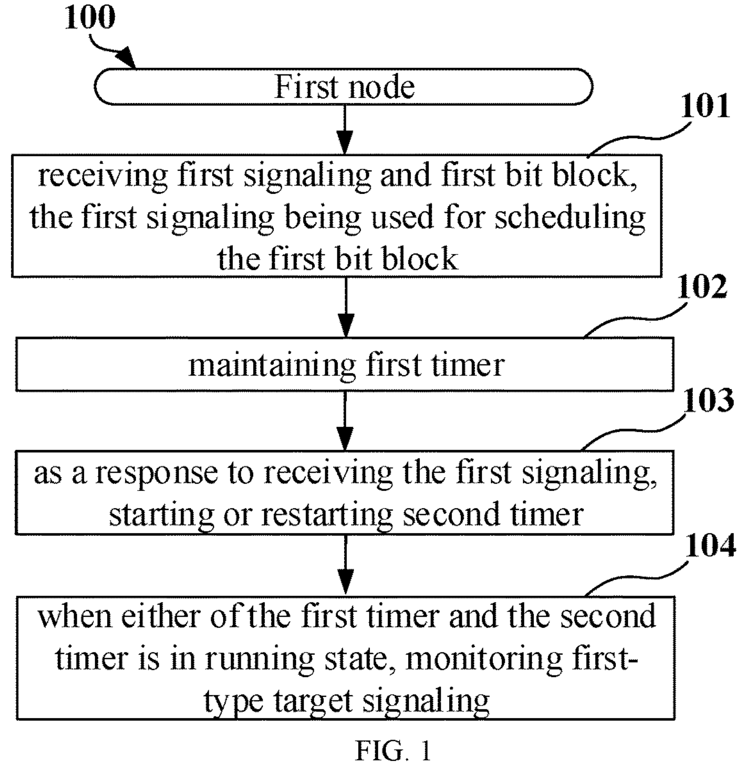
FIG. 1 illustrates a flowchart of transmission of a first node according to one embodiment of the present application.
FIG. 2 illustrates a schematic diagram of a network architecture according to one embodiment of the present application.

Embodiment 1 illustrates a flowchart of transmission of a first node according to one embodiment of the present application, as shown in FIG. 1.

In Embodiment 1, a first node 100 receives a first signaling and a first bit block in step 101, the first signaling being used for scheduling the first bit block; and maintains a first timer in step 102; and in step 103, as a response to receiving the first signaling, starts or restarts a second timer; and in step 104, when either of the first timer and the second timer is in a running state, monitors a first-type target signaling; herein, the first timer and the second timer are configured for a same DRX group; the action of maintaining a first timer comprises adjusting the time while the first timer is running, and whether a reception of the first bit block is used for adjusting the time while the first timer is running is related to contents in the first bit block; when each condition in a first condition set is satisfied, the reception of the first bit block is used for adjusting the time while the first timer is running; the first bit block comprising any data type in a first data type set is a condition in the first condition set, the first data type set comprising at least one data type.

In one embodiment, a first signaling and a first bit block are received via an air interface.

In one embodiment, the air interface is a Uu interface.

In one embodiment, the air interface is a PC5 interface.

In one embodiment, the first signaling is a physical layer signaling.

In one embodiment, the first signaling is an RRC signaling, the first signaling comprising a configured grant (CG).

In one embodiment, the first signaling is a piece of Downlink Control Information (DCI).

In one embodiment, the first signaling is a piece of Sidelink Control Information (SCI).

In one embodiment, the first signaling is a Physical Downlink Control CHannel (PDCCH).

In one embodiment, the first signaling is a Physical Sidelink Control CHannel (PSCCH).

In one embodiment, the first bit block is transmitted through a Physical Downlink Shared CHannel (PDSCH), the PDSCH being an initial transmission of the first bit block.

In one embodiment, the first bit block is transmitted through a Physical Sidelink Shared CHannel (PSSCH), the PSSCH being an initial transmission of the first bit block.

In one embodiment, the first bit block is a Protocol Data Unit (PDU).

In one embodiment, the first bit block is a PDU set.

In one embodiment, the first bit block is a Medium Access Control (MAC) PDU.

In one embodiment, a MAC PDU comprises at least one MAC subPDU.

In one embodiment, the first bit block is all subPDUs in a MAC PDU.

In one embodiment, the first bit block is a MAC subPDU.

In one embodiment, a MAC subPDU comprises only one MAC subheader, or one MAC subheader and one MAC Service Data Unit (SDU), or, one MAC subheader and one MAC Control Element (CE), or one subheader and padding.

In one embodiment, the first bit block is a Transport Block (TB).

In one embodiment, the first bit block is a Code Block (CB).

In one embodiment, the first bit block is a codeword (CW).

In one embodiment, the type of the first bit block is explicitly indicated.

In one embodiment, the type of the first bit block is implicitly indicated.

In one embodiment, the first signaling is used for scheduling the first bit block.

In one embodiment, the phrase that "the first signaling is used for scheduling the first bit block" comprises that: the first signaling comprises configuration information of a first radio signal, the first radio signal comprising the first bit block, and the configuration information comprises at least one of time-domain resources, frequency-domain resources, a Modulation and Coding Scheme (MCS), or a Hybrid Automatic Repeat Request (HARQ) process ID.

In one embodiment, the first processor maintains a first timer.

In one embodiment, the first timer is maintained in a MAC sublayer of the first node.

In one embodiment, the action of maintaining a first timer comprises: starting the first timer.

In one embodiment, the action of maintaining a first timer comprises: updating the first timer.

In one embodiment, the action of maintaining a first timer comprises: when the first timer is expired, stopping the first timer.

In one embodiment, as a response to receiving the first signaling, start or restart the second timer.

In one embodiment, the first signaling indicates a new transmission.

In one embodiment, the first signaling indicates a Downlink (DL) new transmission.

In one embodiment, the second timer is maintained in a MAC sublayer of the first node.

In one embodiment, at least one serving cell of a MAC entity of the first node can be configured in at least one DRX group by RRC; when RRC does not configure a secondary DRX group, there is only one DRX group and all serving cells belong to the DRX group; when RRX configures two DRX groups, each serving cell is uniquely assigned to one of the two DRX groups; each DRX group is configured with separate DRX parameters.

In one embodiment, DRX parameters separately configured for each DRX group include a drx-onDurationTimer and a drx-InactivityTimer; DRX parameters common to all DRX groups include at least one of a drx-SlotOffset, a drx-RetransmissionTimerDL, a drx-RetransmissionTimerUL, a drx-LongCycleStartOffset, a drx-ShortCycle, a drx-ShortCycleTimer, a drx-HARQ-RTT-TimerDL, a drx-HARQ-RTT-TimerUL, or a uplinkHARQ-Mode.

In one embodiment, the first timer and the second timer are configured for a same DRX group.

In one embodiment, the active time of (a) serving cell(s) comprised by the DRX group comprises the time while the first timer or the second timer is in a running state, the DRX group comprising at least one serving cell.

In one embodiment, the first signaling indicates a new transmission on a serving cell in the DRX group.

In one embodiment, as a response to receiving the first signaling, starting or restarting a third timer, the third timer and the second timer being configured for different DRX groups, where each serving cell of at least one serving cell of a MAC entity of the first node is configured in either of two DRX groups.

In one embodiment, the third timer is maintained in a MAC sublayer of the first node.

In one embodiment, the first timer, the second timer and the third timer are all DRX-related timers.

In one embodiment, the first timer is a drx-Onduration-Timer.

In one embodiment, the second timer is a drx-Inactivity-Timer.

In one embodiment, the third timer is a drx-Inactivity-Timer.

In one embodiment, when either of the first timer and the second timer is in a running state, monitoring a first-type target signaling.

In one embodiment, when either of the first timer and the second timer is in a running state, monitoring a first-type target signaling on at least one serving cell comprised by a DRX group in which the first timer and the second timer are configured.

In one embodiment, the phrase that "when either of the first timer and the second timer is in a running state, monitoring a first-type target signaling" comprises: when a DRX group is in the active time, monitoring a first-type target signaling on at least one serving cell comprised by the DRX group; the DRX group in the active time comprising the time while any of the first timer or the second timer is in a running state, the first timer and the second timer being configured for the DRX group.

In one embodiment, the first-type target signaling is used for indicating one of a downlink transmission, or an uplink transmission, or a one-shot HARQ, or a retransmission of a HARQ feedback, or a sidelink transmission, or a new transmission (including in DL, UL or SL) on one serving cell in the DRX group.

In one embodiment, the first-type target signaling is a physical layer signaling.

In one embodiment, the first-type target signaling is a physical layer control signaling.

In one embodiment, the first-type target signaling is a piece of Sidelink Control Information (SCI).

In one embodiment, the first-type target signaling is transmitted through a Physical Sidelink Control CHannel (PSCCH).

In one embodiment, the first-type target signaling is transmitted through a PSCCH and a Physical Sidelink Shared CHannel (PSSCH) together.

In one embodiment, the first-type target signaling is a piece of Downlink Control Information (DCI).

In one embodiment, the first-type target signaling is a Physical Downlink Control Channel (PDCCH).

In one embodiment, the first-type target signaling is transmitted via the air interface.

In one embodiment, the first-type target signaling is addressed to any Radio Network Temporary Identifier (RNTI) in a first RNTI set, the first RNTI set comprising at least one RNTI, and each RNTI in the first RNTI set being allocated by a serving cell comprised by a DRX group configured for the first timer and the second timer.

In one embodiment, each RNTI in the first RNTI set is used for identifying the first node or a group in which the first node is joined.

In one embodiment, any RNTI comprised in the first RNTI set is one of a Cell-RNTI (C-RNTI), or a Configured Scheduling-RNTI (CS-RNTI), or a Group-RNTI (G-RNTI), or a Group Configured Scheduling RNTI (G-CS-RNTI), or a SideLink-RNTI (SL-RNTI), or a SideLink Configured Scheduling RNTI (SLCS-RNTI).

In one embodiment, when either of the first timer and the second timer is in a running state, monitoring the first-type target signaling in each slot where a wireless reception is performed.

In one subembodiment, no wireless transmission is performed in any slot where a wireless reception is performed.

In one subembodiment, a wireless transmission is performed simultaneously in each slot where a wireless reception is performed.

In one embodiment, the phrase of monitoring a first-type target signaling comprises: performing energy detection on the first-type target signaling.

In one embodiment, the phrase of monitoring a first-type target signaling comprises: performing Cyclic Redundancy Check (CRC) verification on the first-type target signaling.

In one embodiment, the phrase of monitoring a first-type target signaling comprises: performing Blind Decoding on the first-type target signaling.

In one embodiment, the phrase of monitoring a first-type target signaling comprises performing Blind Decoding respectively on each RE (Resource Element) set among multiple RE sets.

In one embodiment, the phrase of monitoring a first-type target signaling comprises: performing Blind Decoding on the first-type target signaling, performing energy detection of a reference signal of a target radio signal and performing decoding of the target radio signal; the first-type target signaling is used for indicating time-frequency resources occupied by the target radio signal and a Modulation and Coding Scheme (MCS) used by the target radio signal.

In one embodiment, the phrase of monitoring a first-type target signaling comprises: performing Blind Decoding of a PSCCH to obtain a 1st-stage SCI, the 1st-stage SCI indicating time-frequency resources occupied by a PSSCH, and performing decoding of the PSSCH, the PSSCH comprising a 2nd-stage-SCI, where the 1st-stage SCI and the 2nd-stage-SCI constitute an SCI; herein, the first-type target signaling is an SCI.

In one embodiment, the action of maintaining a first timer comprises adjusting the time while the first timer is running.

In one embodiment, whether a reception of the first bit block is used for adjusting the time while the first timer is running is related to contents in the first bit block.

In one embodiment, when any condition in the first condition set is unsatisfied, the reception of the first bit block is not used for adjusting the time while the first timer is running.

In one embodiment, the first processor, in cases when any condition in the first condition set is unsatisfied, determines not to adjust the time while the first timer is running.

In one embodiment, the phrase that the reception of the first bit block is not used for adjusting the time while the first timer is running comprises that: the time while the first timer is running is identical to a reference running time.

In one embodiment, the reference running time is running time of the first timer within a second time period, the second time period being a latest time period before a first time period.

In one embodiment, the phrase that the time while the first timer is running is identical to a reference running time comprises that: where a start time of the first timer in a first time period is located within the first time period is identical to where a start time of the first timer in a second time period is located within the second time period; an expiration value of the first timer within the first time period is identical to an expiration value of the first timer within the second time period.

In one embodiment, the first bit block is received during the time while the first timer is in a running state within the second time period.

In one embodiment, the first bit block is received during the time while the first timer is in a running state within a time period earlier than the second time period.

In one embodiment, the phrase where a start time of the first timer in a time period is located within the time period comprises: a time interval from a start time of the first timer in a time period to a start of the time period.

In one embodiment, when each condition in the first condition set is satisfied, the reception of the first bit block is used for adjusting the time while the first timer is running.

In one embodiment, the first processor, in cases when each condition in the first condition set is satisfied, determines to adjust the time while the first timer is running.

In one embodiment, the phrase that the reception of the first bit block is used for adjusting the time while the first timer is running comprises that: the time while the first timer is running is different from a reference running time.

In one embodiment, the phrase that the time while the first timer is running is different from a reference running time comprises that: where a start time of the first timer in a first time period is located within the first time period is different from where a start time of the first timer in a second time period is located within the second time period, or, an expiration value of the first timer within the first time period is different from an expiration value of the first timer within the second time period.

In one embodiment, the first bit block comprising any data type in a first data type set is a condition in the first condition set, the first data type set comprising at least one data type.

In one embodiment, when the first bit block does not comprise any data type in the first data type set, the reception of the first bit block is not used for adjusting the time while the first timer is running.

In one embodiment, when the first bit block comprises any data type in the first data type set, the reception of the first bit block is used for adjusting the time while the first timer is running; herein, the first condition set only comprises one condition, that is, the first bit block comprises any data type in the first data type set.

In one embodiment, when each condition in the first condition set is satisfied, a start time of the first timer is determined according to a frame number, a first starting offset, a first slot offset and a first time length.

In one embodiment, the first time length is a duration of a DRX cycle.

In one embodiment, the first time length is no smaller than 2 milliseconds (ms).

In one embodiment, the first time length is configured by the network.

In one embodiment, the DRX cycle is a drx-ShortCycle.

In one embodiment, the DRX cycle is a drx-LongCycle.

In one embodiment, the DRX cycle is a sidelink DRX cycle.

In one embodiment, the DRX cycle is a drx-LongCycle for Point-to-Multipoint (PTM).

In one embodiment, the frame number is a System Frame Number (SFN) or a Direct Frame Number (DFN).

In one embodiment, the first starting offset and the first slot offset are configured by the network.

In one embodiment, the first starting offset is a Destination Layer-2 ID.

In one embodiment, the first slot offset is a remainder yielded by a Destination Layer-2 ID being divided by the first time length.

In one embodiment, when each condition in the first condition set is satisfied, a position is selected from K positions at equal probability as a position of a start time of the first timer in a DRX cycle.

In one embodiment, the K positions are configured by the network.

In one embodiment, there is an identical time interval between every two adjacent positions among the K positions.

In one embodiment, when each condition in the first condition set is satisfied, a time-length indicated by an expiration value of the first timer is adjusted to the first time length.

In one embodiment, the expiration value of the first timer is used to determine the expiration of the first timer.

Embodiment 2

Embodiment 2 illustrates a schematic diagram of a network architecture according to one embodiment of the present application, as shown in FIG. 2. FIG. 2 illustrates a network architecture 200 of NR 5G, Long-Term Evolution (LTE), and Long-Term Evolution Advanced (LTE-A) systems. The NR 5G or LTE, or LTE-A network architecture 200 may be called a 5G System/Evolved Packet System (5GS/EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server/Unified Data Management (HSS/UDM) 220 and an Internet Service 230. The 5GS/EPS may be interconnected with other access networks. For simple description, the entities/interfaces are not shown. As shown in FIG. 2, the 5GS/EPS provides packet switching services. Those skilled in the art will find it easy to understand that various concepts presented throughout the present application can be extended to networks providing circuit switching services or other cellular networks. The NG-RAN comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN, the gNB 203 can be a satellite, an aircraft or a terrestrial base station relayed through the satellite. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, vehicle-mounted equipment, vehicle-mounted communication units, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services.

In one embodiment, the UE 201 corresponds to a first node in the present application.

In one embodiment, the gNB203 corresponds to a second node in the present application.

In one embodiment, the gNB203 is a Macro Cell base station.

In one embodiment, the gNB203 is a Micro Cell base station.

In one embodiment, the gNB203 is a Pico Cell base station.

In one embodiment, the gNB203 is a Femtocell.

In one embodiment, the gNB203 is a base station supporting large time-delay difference.

In one embodiment, the gNB203 is a flight platform.

In one embodiment, the gNB203 is satellite equipment.

In one embodiment, the gNB203 is a piece of test equipment (e.g., a transceiving device simulating partial functions of the base station, or a signaling test instrument).

In one embodiment, a radio link from the UE201 to the gNB203 is an uplink, the uplink being used for performing uplink transmission.

In one embodiment, a radio link from the gNB203 to the UE201 is a downlink, the downlink being used for performing downlink transmission.

In one embodiment, the UE201 and the gNB203 are connected by a Uu interface.

Although not shown in FIG. 2, the UE201 is connected with another UE via a PC5 interface, and a radio link between the two UEs is a sidelink; the other UE corresponds to the second node in the present application.

Embodiment 3

Figure 3:
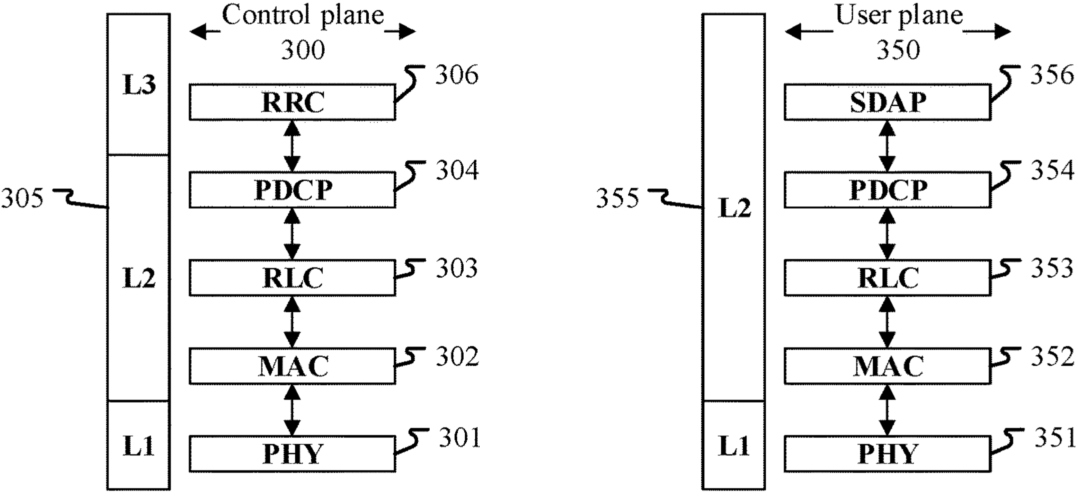
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 of a UE and a gNB is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the UE and the gNB via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. The PDCP sublayer 304 provides data encryption and integrity protection, and also support for handover of a UE between gNBs. The RLC sublayer 303 provides segmentation and reassembling of a packet, retransmission of a lost packet through ARQ, and detection of duplicate packets and protocol errors. The MAC sublayer 302 provides mappings between a logical channel and a transport channel as well as multiplexing of logical channel ID. The MAC sublayer 302 is also responsible for allocating between UEs various radio resources (i.e., resource block) in a cell. The MAC sublayer 302 is also in charge of Hybrid Automatic Repeat Request (HARQ) operation. In the control plane 300, The Radio Resource Control (RRC) sublayer 306 in the L3 layer is responsible for acquiring radio resources (i.e., radio bearer) and configuring the lower layer using an RRC signaling between the gNB and the UE. Although not shown in the figure, above the RRC sublayer 306 in the control plane 300 of the UE there can be a V2X layer, which is in charge of generating a PC5 QoS parameter group and a QoS rule according to received traffic data or traffic requests, generating a PC5 QoS flow corresponding to the PC5 QoS parameter group and sending a PC5 QoS flow ID and the corresponding PC5 QoS parameter group to an Access Stratum (AS) to be used for QoS processing of a packet that belongs to the PC5 QoS flow ID; the V2X layer also comprises a PC5-Signaling Protocol (PC5-S) sublayer; the V2X layer is responsible for indicating whether each transmission in the AS is a PC5-S Protocol transmission or a V2X traffic data transmission. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between Quality of Service (QoS) streams and a Data Radio Bearer (DRB), so as to support diversified traffics. The radio protocol architecture of UE in the user plane 350 may comprise all or part of protocol sublayers of a SDAP sublayer 356, a PDCP sublayer 354, a RLC sublayer 353 and a MAC sublayer 352 in L2. Although not described in FIG. 3, the UE may comprise several higher layers above the L2 355, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to a first node in the present application.

In one embodiment, the radio protocol architecture in FIG. 3 is applicable to a second node in the present application.

In one embodiment, the first signaling in the present application is generated by the PHY301 or the PHY351.

In one embodiment, the first bit block in the present application is generated by the MAC302 or the MAC352.

In one embodiment, the first bit block in the present application is generated by the RLC303 or the RLC353.

In one embodiment, the first bit block in the present application is generated by the PDCP304 or the PDCP354.

In one embodiment, the second signaling in the present application is generated by the RRC306.

In one embodiment, the second signaling in the present application is generated by the MAC302 or the MAC352.

In one embodiment, the first-type target signaling in the present application is generated by the PHY301 or the PHY351.

In one embodiment, the L2 305 or 355 belongs to higher layers.

In one embodiment, the RRC sublayer 306 in the L3 belongs to a higher layer.

Embodiment 4

Figure 4:
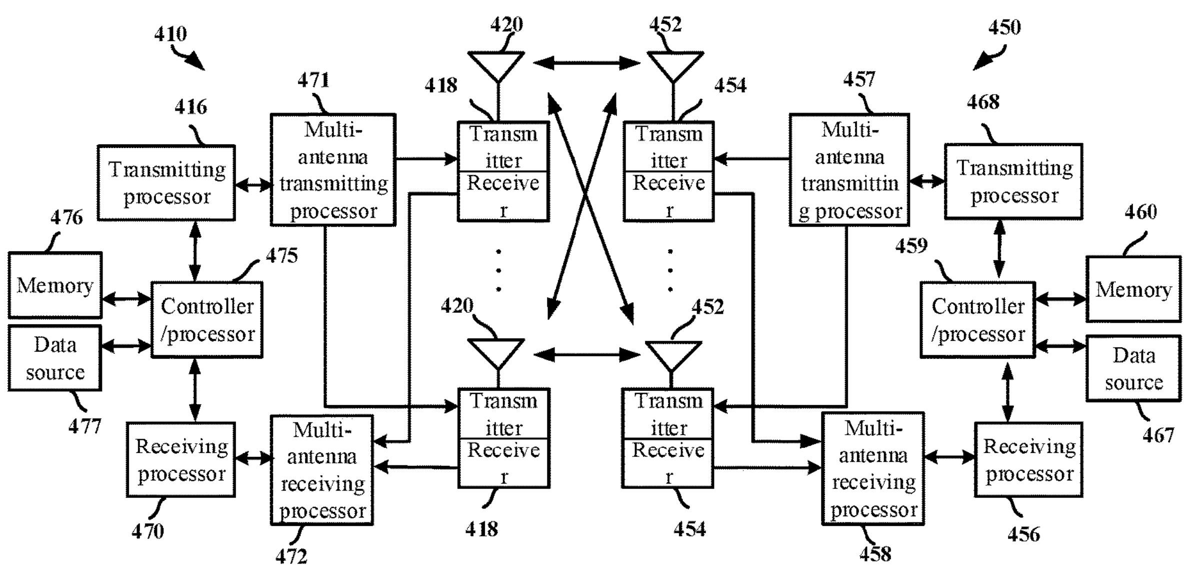
FIG. 4 illustrates a schematic diagram of hardcore modules in a communication device according to one embodiment of the present application.

Embodiment 4 illustrates a schematic diagram of hardcore modules in a communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a data source 477, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network or from a data source 477 is provided to the controller/processor 475. The core network and data source 477 represents all protocol layers above the L2 layer. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multi-carrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In a transmission from the second communication device 410 to the first communication device 450, the controller/processor 459 provides de-multiplexing between a transport channel and a logical channel, packet reassembling, decrypting, header decompression, control signal processing so as to recover a higher-layer packet from the second communication device 410. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device 450. The higher-layer packet coming from the controller/processor 475 may be provided to the core network, or all protocol layers above the L2, or, various control signals can be provided to the core network or L3 for processing.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: receives a first signaling and a first bit block, the first signaling being used for scheduling the first bit block; and maintains a first timer; and as a response to receiving the first signaling, starts or restarts a second timer; and when either of the first timer and the second timer is in a running state, monitors a first-type target signaling; herein, the first timer and the second timer are configured for a same DRX group; the action of maintaining a first timer comprises adjusting the time while the first timer is running, and whether a reception of the first bit block is used for adjusting the time while the first timer is running is related to contents in the first bit block; when each condition in a first condition set is satisfied, the reception of the first bit block is used for adjusting the time while the first timer is running; the first bit block comprising any data type in a first data type set is a condition in the first condition set, the first data type set comprising at least one data type.

In one embodiment, the first communication device 450 comprises a memory that stores a computer readable instruction program, the computer readable instruction program generates actions when executed by at least one processor, which include: receiving a first signaling and a first bit block, the first signaling being used for scheduling the first bit block; and maintaining a first timer; and as a response to receiving the first signaling, starting or restarting a second timer; and when either of the first timer and the second timer is in a running state, monitoring a first-type target signaling; herein, the first timer and the second timer are configured for a same DRX group; the action of maintaining a first timer comprises adjusting the time while the first timer is running, and whether a reception of the first bit block is used for adjusting the time while the first timer is running is related to contents in the first bit block; when each condition in a first condition set is satisfied, the reception of the first bit block is used for adjusting the time while the first timer is running; the first bit block comprising any data type in a first data type set is a condition in the first condition set, the first data type set comprising at least one data type.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a first signaling and a first bit block, the first signaling being used for scheduling the first bit block; herein, a first timer is maintained; a reception of the first signaling is used for starting or restarting a second timer; when any of the first timer or the second timer is in a running state, a first-type target signaling is being monitored; the first timer and the second timer are configured for a same DRX group; the first timer being maintained comprises the time while the first timer is running being adjusted, and whether a reception of the first bit block is used for adjusting the time while the first timer is running is related to contents in the first bit block; when each condition in a first condition set is satisfied, the reception of the first bit block is used for adjusting the time while the first timer is running; the first bit block comprising any data type in a first data type set is a condition in the first condition set, the first data type set comprising at least one data type; the first timer and the second timer are respectively maintained by a receiver of the first signaling.

In one embodiment, the second communication device 410 comprises a memory that stores a computer readable instruction program, the computer readable instruction program generates actions when executed by at least one processor, which include: transmitting a first signaling and a first bit block, the first signaling being used for scheduling the first bit block; herein, a first timer is maintained; a reception of the first signaling is used for starting or restarting a second timer; when any of the first timer or the second timer is in a running state, a first-type target signaling is being monitored; the first timer and the second timer are configured for a same DRX group; the first timer being maintained comprises the time while the first timer is running being adjusted, and whether a reception of the first bit block is used for adjusting the time while the first timer is running is related to contents in the first bit block; when each condition in a first condition set is satisfied, the reception of the first bit block is used for adjusting the time while the first timer is running; the first bit block comprising any data type in a first data type set is a condition in the first condition set, the first data type set comprising at least one data type; the first timer and the second timer are respectively maintained by a receiver of the first signaling.

In one embodiment, the first communication device 450 corresponds to the first node in the present application.

In one embodiment, the second communication device 410 corresponds to the second node in the present application.

In one embodiment, the first communication device 450 is a UE.

In one embodiment, the second communication device 410 is a base station.

In one embodiment, the second communication device 410 is a UE.

In one embodiment, the second communication device 410 is a RoadSide Unit (RSU).

In one embodiment, at least one of the antenna 420, the transmitter 418, the multi-antenna transmitting processor 471, the transmitting processor 416 or the controller/processor 475 is used for transmitting a first signaling in the present application.

In one embodiment, at least one of the antenna 452, the receiver 454, the multi-antenna receiving processor 458, the receiving processor 456 or the controller/processor 459 is used for receiving a first signaling in the present application.

In one embodiment, at least one of the antenna 420, the transmitter 418, the multi-antenna transmitting processor 471, the transmitting processor 416 or the controller/processor 475 is used for transmitting a first bit block in the present application.

In one embodiment, at least one of the antenna 452, the receiver 454, the multi-antenna receiving processor 458, the receiving processor 456 or the controller/processor 459 is used for receiving a first bit block in the present application.

In one embodiment, at least one of the antenna 420, the transmitter 418, the multi-antenna transmitting processor 471, the transmitting processor 416 or the controller/processor 475 is used for transmitting a second signaling in the present application.

In one embodiment, at least one of the antenna 452, the receiver 454, the multi-antenna receiving processor 458, the receiving processor 456 or the controller/processor 459 is used for receiving a second signaling in the present application.

In one embodiment, at least one of the antenna 420, the transmitter 418, the multi-antenna transmitting processor 471, the transmitting processor 416 or the controller/processor 475 is used for transmitting a first-type target signaling in the present application.

In one embodiment, at least one of the antenna 452, the receiver 454, the multi-antenna receiving processor 458, the receiving processor 456 or the controller/processor 459 is used for receiving a first-type target signaling in the present application.

Embodiment 5

Figures 5, 6, 7:
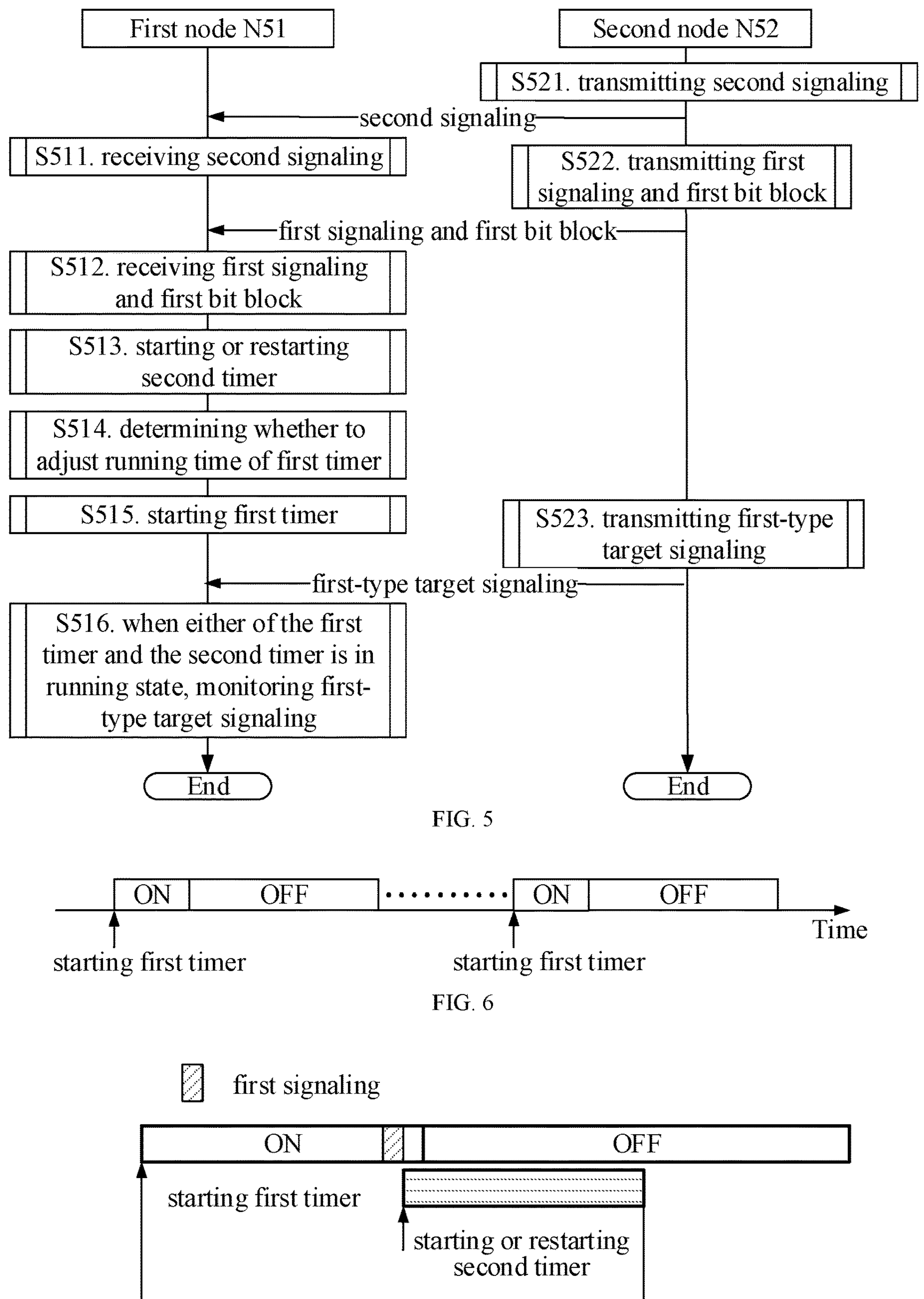
FIG. 5 illustrates a flowchart of radio signal transmission according to one embodiment of the present application.
FIG. 6 illustrates a schematic diagram of a relation between a first timer's running and DRX according to one embodiment of the present application.
FIG. 7 illustrates a schematic diagram of relations among a first timer, a second timer, a first signaling and monitoring a first-type target signaling according to one embodiment of the present application.

Embodiment 5 illustrates a flowchart of radio signal transmission according to one embodiment of the present application, as shown in FIG. 5. In FIG. 5, a first node N51 and a second node N52 are in communication via a radio interface. It should be particularly noted that the sequence illustrated herein does not set any limit to the signal transmission order or implementation order in the present application.

The first node N51 receives a second signaling in step S511; and receives a first signaling and a first bit block in step S512; and in step S513, as a response to receiving the first signaling, starts or restarts a second timer; determines whether to adjust running time of a first timer in step S514; starts a first timer in step S515; and in step S516, when either of the first timer and the second timer is in a running state, monitoring a first-type target signaling.

The second node N52 transmits a second signaling in step S521; transmits a first signaling and a first bit block in step S522; and transmits a first-type target signaling in step S523.

It should be noted that multiple first-type target signalings can be transmitted in the step S523.

It should be noted that the step S514 is taken after having received the first bit block, and that the order of performing the step S514 and the step S513 is not restricted, which means that they can be exchanged.

In Embodiment 5, receiving a first signaling and a first bit block, the first signaling being used for scheduling the first bit block; and maintaining a first timer; and as a response to receiving the first signaling, starting or restarting a second timer; and when either of the first timer and the second timer is in a running state, monitoring a first-type target signaling; herein, the first timer and the second timer are configured for a same DRX group; the action of maintaining a first timer comprises adjusting the time while the first timer is running, and whether a reception of the first bit block is used for adjusting the time while the first timer is running is related to contents in the first bit block; when each condition in a first condition set is satisfied, the reception of the first bit block is used for adjusting the time while the first timer is running; the first bit block comprising any data type in a first data type set is a condition in the first condition set, the first data type set comprising at least one data type; receiving a second signaling, the second signaling indicating a first identifier set; herein, each identifier in the first identifier set corresponds to a data type in the first data type set; the phrase of adjusting the time while the first timer is running comprises at least one of adjusting a start time of the first timer or adjusting an expiration value of the first timer.

In one embodiment, the second node is a base station or a Transmit/Receive Point (TRP) for a serving cell of the first node.

In one embodiment, the second node is a base station or TRP for a primary cell (PCell) of the first node.

In one embodiment, the second node is a base station or TRP for a secondary cell (SCell) of the first node.

In one embodiment, the second node is a base station or TRP for a camping cell of the first node.

In one embodiment, the second node is a base station or TRP for serving cell(s) comprised in a DRX group for which the first timer and the second timer are configured.

In one embodiment, a second signaling is received via the air interface.

In one embodiment, the second signaling is transmitted internally within the first node.

In one embodiment, the second signaling is a higher-layer signaling.

In one embodiment, the second signaling is conveyed from a higher layer of the first node to a MAC sublayer of the first node.

In one embodiment, the second signaling is a downlink signaling.

In one embodiment, the second signaling is a Sidelink (SL) signaling.

In one embodiment, the second signaling is an RRC signaling.

In one embodiment, the second signaling is a MAC sub-layer signaling.

In one embodiment, the second signaling is a MAC CE.

In one embodiment, the second signaling comprises all or part of Information Elements (IEs) in an RRC message.

In one embodiment, the second signaling comprises all or part of fields of an IE in an RRC message.

In one embodiment, the second signaling is DRX group-specific.

In one embodiment, the second signaling is Cell Specific.

In one embodiment, the second signaling is a piece of zone-specific information, where the zone is determined based on a UE's positional information.

In one embodiment, the second signaling is a group of UE group-specific information.

In one embodiment, the second signaling is UE-specific information.

In one embodiment, the second signaling is transmitted through a DownLink-Shared Channel (DL-SCH).

In one embodiment, the second signaling is transmitted through a PDSCH.

In one embodiment, the second signaling indicates a first identifier set, the first identifier set comprising at least one identifier.

In one embodiment, the first identifier set comprises at least one Logical Channel Identifier (LCID).

In one embodiment, the first identifier set comprises at least one Radio Bearer (RB) identifier.

In one embodiment, the first identifier set comprises at least one Link layer identifier.

In one embodiment, the first identifier set comprises at least one Destination Layer 2 identifier.

In one embodiment, the first identifier set comprises at least one Source Layer 2 identifier.

In one embodiment, the first identifier set comprises at least one PDU set identifier.

In one embodiment, the first identifier set comprises at least one PDU identifier.

In one embodiment, the first identifier set comprises at least one RNTI, and each of the at least one RNTI is a G-RNTI, or a G-CS-RNTI, or an MBS Control Channel-RNTI (MCCH-RNTI).

In one embodiment, each identifier in the first identifier set indicates a data type in the first data type set.

In one embodiment, the phrase of the first bit block comprising any data type in a first data type set comprises that: the first bit block comprises any identifier in a first identifier set.

In one embodiment, when the first bit block comprises a MAC subPDU and a logical channel identifier (LCID) comprised by a MAC subheader in the MAC subPDU belongs to the first identifier set, the first bit block comprises one data type in the first data type set; herein, the first identifier set comprises at least one logical channel identifier.

In one embodiment, when the first bit block comprises a MAC SDU and the MAC SDU belongs to a logical channel in the first identifier set, the first bit block comprises one data type in the first data type set; herein, the first identifier set comprises at least one logical channel identifier.

In one embodiment, when the first bit block comprises a MAC CE and the MAC CE belongs to a logical channel in the first identifier set, the first bit block comprises one data type in the first data type set; herein, the first identifier set comprises at least one logical channel identifier.

In one embodiment, the first condition set comprises that the first signaling comprises at least part of a destination L2 identifier, and that a destination L2 identifier consisting of the at least part of a destination L2 identifier comprised by the first signaling and the at least partial bits of the destination L2 identifier comprised by the first bit block belongs to a destination L2 identifier in the first identifier set; herein, the first identifier set comprises at least one destination L2 identifier.

In one embodiment, when the first bit block comprises at least partial bits of a destination L2 identifier and a destination L2 identifier consisting of the at least partial bits of a destination L2 identifier and at least partial bits of a destination L2 identifier comprised by the first signaling belongs to a destination L2 identifier in the first identifier set, the first bit block comprises one data type in the first data type set; herein, the first identifier set comprises at least one destination L2 identifier.

In one embodiment, a destination L2 identifier comprises 24 bits, where the first bit block comprises higher 8 bits of the destination L2 identifier, while the first signaling comprises lower 16 bits of the destination L2 identifier.

In one embodiment, the first condition set comprises that the first signaling comprises at least part of a source L2 identifier, and a source L2 identifier consisting of the at least part of the source L2 identifier and the at least partial bits of the source L2 identifier comprised by the first bit block belongs to a source L2 identifier in the first identifier set; herein, the first identifier set comprises at least one source L2 identifier.

In one embodiment, when the first bit block comprises at least partial bits of a source L2 identifier and a source L2 identifier consisting of the at least partial bits of the source L2 identifier and at least partial bits of a source L2 identifier comprised by the first signaling belongs to a source L2 identifier in the first identifier set, the first bit block comprising one data type in the first data type set; herein, the first identifier set comprises at least one source L2 identifier.

In one embodiment, a source L2 identifier comprises 24 bits, where the first bit block comprises higher 16 bits of the source L2 identifier, while the first signaling comprises lower 8 bits of the source L2 identifier.

In one embodiment, the phrase of the first bit block comprising any data type in a first data type set comprises that: the first bit block is scrambled by any identifier in a first identifier set; herein, the first identifier set comprises at least one RNTI.

In one embodiment, when the first bit block is scrambled by any identifier in the first identifier set, the first bit block is a data type in the first data type set; herein, the first identifier set comprises at least one RNTI.

In one embodiment, the phrase of adjusting the time while the first timer is running comprises at least one of adjusting a start time of the first timer or adjusting an expiration value of the first timer.

In one embodiment, the phrase of adjusting the time while the first timer is running comprises adjusting a start time of the first timer.

In one embodiment, the phrase of adjusting the time while the first timer is running comprises adjusting an expiration value of the first timer.

In one embodiment, the phrase of adjusting the time while the first timer is running comprises adjusting a start time and an expiration value of the first timer.

In one embodiment, the phrase of adjusting the time while the first timer is running comprises: of three adjacent start times of the first timer a time interval between every two adjacent start times is different from the other two adjacent start times.

In one embodiment, the phrase of adjusting the time while the first timer is running comprises: expiration values respectively after two adjacent starts of the first timer are different.

Embodiment 6

Embodiment 6 illustrates a schematic diagram of a relation between a first timer's running and DRX according to one embodiment of the present application, as shown in FIG. 6. In FIG. 6, when the first timer is in a running state, the state is indicated by "ON"; when the first timer stops running, the state is indicated by "OFF".

In one embodiment, the first timer is a drx-onDurationTimer.

In one embodiment, the first timer is a drx-onDurationTimerPTM used for PTM transmission.

In one embodiment, the first timer is a sl-drx-onDurationTimer used for sidelink transmission.

In one embodiment, the first timer is associated with a pair of a source L2 identifier and a destination L2 identifier.

In one embodiment, the first timer runs once per DRX cycle.

In one embodiment, the phrase that the first timer runs once per DRX cycle comprises that: the first timer starts once per DRX cycle.

In one embodiment, the phrase that the first timer runs once per DRX cycle comprises that: the first timer expires once per DRX cycle.

In one embodiment, the phrase that the first timer runs once per DRX cycle comprises that: the first timer starts once and expires once per DRX cycle.

In one embodiment, a duration of a DRX cycle comprises the time while the first timer is in one time of running and the time while the first timer is stopped after the running.

In one embodiment, a duration of a DRX cycle comprises the time while the first timer is in one time of running and the time while the first timer is stopped before the running.

In one embodiment, when any condition in the first condition set is unsatisfied, every two adjacent start times among three adjacent start times of the first timer are spaced by a same time interval.

In one embodiment, when any condition in the first condition set is unsatisfied, start times of the first timer respectively in two adjacent runnings have a same position in respectively belonging DRX cycles.

In one embodiment, when any condition in the first condition set is unsatisfied, expiration values of the first timer respectively after two adjacent starts of the first timer are identical.

Embodiment 7

Embodiment 7 illustrates a schematic diagram of relations among a first timer, a second timer, a first signaling and monitoring a first-type target signaling according to one embodiment of the present application, as shown in FIG. 7. In FIG. 7, when the first timer is in a running state, the state is indicated by "ON"; when the first timer stops running, the state is indicated by "OFF"; the slash-filled box represents a first signaling; the horizontal-line-filled box represents a second timer in a running state.

In one embodiment, the running of the first timer and the running of the second timer are mutually independent.

In one embodiment, when the second timer starts, the first timer is in a running state.

In one embodiment, when the second timer restarts, the first timer is either in a running state or in a suspended state.

In one embodiment, before the second timer expires, restart the second timer; after the second timer is expired, start the second timer.

In one embodiment, start or restart the second timer at a first symbol after an end of receiving the first signaling.

In one embodiment, when either of the first timer and the second timer is in a running state, monitoring a first-type target signaling on at least one serving cell comprised by a DRX group for which the first timer and the second timer are configured.

In one embodiment, while a DRX group for which the first timer and the second timer are configured is in the active time, receiving the first signaling.

Embodiment 8

Figure 8:
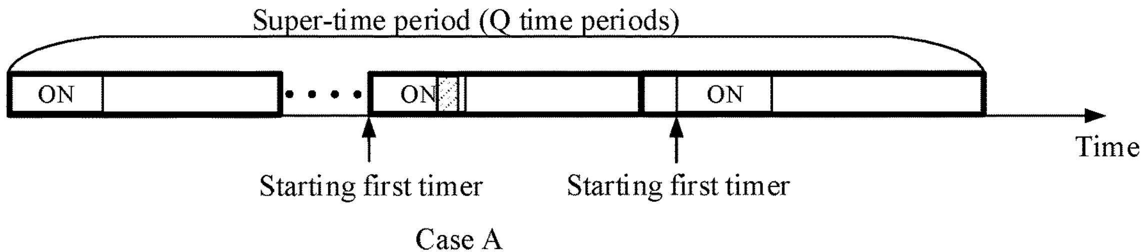
FIG. 8 illustrates a schematic diagram of adjusting the time while a first timer is running according to one embodiment of the present application.
Figure 8:
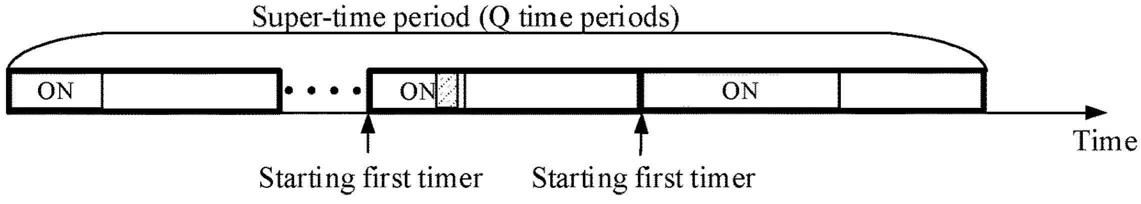

Embodiment 8 illustrates a schematic diagram of adjusting the time while a first timer is running according to one embodiment of the present application, as shown in FIG. 8. In FIG. 8, when the first timer is in a running state, the state is indicated by "ON"; a thick-line box represents a time period in a super-time period; the grid-filled box represents a first bit block; for a streamlined schematic diagram, FIG. 8 only illustrates a super-time period.

In one embodiment, whether a reception of the first bit block is used for adjusting the time while the first timer is running is related to the time for receiving the first bit block.

In one embodiment, whether a reception of the first bit block is used for adjusting the time while the first timer is running is related to both the contents in the first bit block and the time for receiving the first bit block.

In one embodiment, the time for receiving the first bit block is an index of the reception of the first bit block in at least one time period comprised by a super-time period.

In one embodiment, the first condition set comprises that the time for receiving the first bit block belongs to one of an M-th time period or a Q-th time period in a super-time period.

In one embodiment, the first condition set comprises that the time for receiving the first bit block belongs to an M-th time period in a super-time period.

In one embodiment, the first condition set comprises that the time for receiving the first bit block belongs to a Q-th time period in a super-time period.

In one embodiment, the first condition set comprises that an index of the reception of the first bit block in a time period in a super-time period is one of M or Q.

In one embodiment, the first condition set is comprised of two conditions, of which one is that the first bit block comprises any data type in a first data type set; the other is that the time for receiving the first bit block belongs to one of an M-th time period or a Q-th time period in a super-time period.

In one embodiment, Q is a positive integer greater than 1.

In one embodiment, M is a positive integer less than Q.

In one embodiment, M is Q−1.

In one embodiment, M is Q−2, where Q is a positive integer greater than 2.

In one embodiment, the super-time period comprises Q time periods.

In one embodiment, indexes of the Q time periods comprised by the super-time period are 1, 2 . . . , and Q, respectively.

In one embodiment, the first M time period(s) among the Q time periods comprised by a super-time period has/have an identical duration.

In one embodiment, the last Q-M time periods among the Q time periods comprised by a super-time period have identical durations.

In one embodiment, the first M time period(s) among the Q time periods comprised by a super-time period has/have an identical duration, which is different from duration(s) of the last Q-M time period(s) among the Q time periods, where the last Q-M time period(s) among the Q time periods has/have an identical duration.

In one embodiment, a duration of each of the first M time period(s) among the Q time periods comprised by a super-time period is different from a duration of each of the last Q-M time period(s) among the Q time periods by one time unit.

In one embodiment, the time unit is 1 ms.

In one embodiment, the time unit is 1 subframe.

In one embodiment, the time unit is 1 slot.

In one embodiment, each time period among the Q time periods is the DRX cycle.

In one embodiment, the first timer runs once per time period in a super-time period.

In one embodiment, when the first bit block comprises any data type in a first data type set and the time for receiving the first bit block belongs to an M-th time period in a super-time period, where a start time of the first timer in the (M+1)-th time period is located within the (M+1)-th time period is adjusted to a position different from where a start time of the first timer in the M-th time period is located within the M-th time period.

In one subembodiment, where a start time of the first timer in the (M+1)-th time period is located within the (M+1)-th time period is later than where a start time of the first timer in the M-th time period is located within the M-th time period.

In one subembodiment, where a start time of the first timer in the (M+1)-th time period is located within the (M+1)-th time period is later than where a start time of the first timer in the M-th time period is located within the M-th time period by K1 time unit(s).

In one subembodiment, an expiration value of the first timer in the (M+1)-th time period is identical to an expiration value of the first timer in the M-th time period.

In one embodiment, a time length indicated by the K1 time unit(s) is no greater than a duration of the (M+1)-th time period being subtracted by a time length indicated by an expiration value of the first timer in the (M+1)-th time period.

In one embodiment, K1 is 1.

In one embodiment, when the first bit block comprises any data type in a first data type set and the time for receiving the first bit block belongs to an M-th time period in a super-time period, an expiration value of the first timer in the (M+1)-th time period is different from an expiration value of the first timer in the M-th time period.

In one subembodiment, an expiration value of the first timer in the (M+1)-th time period is greater than an expiration value of the first timer in the M-th time period.

In one subembodiment, an expiration value of the first timer in the (M+1)-th time period is greater than an expiration value of the first timer in the M-th time period by K2 time unit(s).

In one subembodiment, an expiration value of the first timer in the (M+1)-th time period is smaller than an expiration value of the first timer in the M-th time period.

In one subembodiment, an expiration value of the first timer in the (M+1)-th time period is smaller than an expiration value of the first timer in the M-th time period by K2 time unit(s).

In one embodiment, a time length indicated by the K2 time unit(s) is no greater than a duration of the M-th time period and no greater than a duration of the (M+1)-th time period.

In one embodiment, K2 is 1.

In one embodiment, when the first bit block comprises any data type in a first data type set and the time for receiving the first bit block belongs to a Q-th time period in a super-time period, where a start time of the first timer in a first time period in a following super-time period is located within the time period it belongs to is adjusted to a position different from where a start time of the first timer in the Q-th time period is located within the time period it belongs to.

In one subembodiment, where a start time of the first timer in a first time period in a following super-time period is located within the time period it belongs to is earlier than where a start time of the first timer in the Q-th time period is located within the time period it belongs to.

In one subembodiment, where a start time of the first timer in a first time period in a following super-time period is located within the time period it belongs to is earlier than where a start time of the first timer in the Q-th time period is located within the time period it belongs to by K3 time unit(s), where a time length indicated by the K3 time unit(s) is no greater than a time length between a start of the Q-th time period and a start time of the first timer in the Q-th time period.

In one embodiment, when the first bit block comprises any data type in a first data type set and the time for receiving the first bit block belongs to a Q-th time period in a super-time period, an expiration value of the first timer in a first time period in a following super-time period is different from an expiration value of the first timer in the Q-th time period.

In one subembodiment, an expiration value of the first timer in a first time period in a following super-time period is greater than an expiration value of the first timer in the Q-th time period.

In one subembodiment, an expiration value of the first timer in a first time period in a following super-time period is greater than an expiration value of the first timer in the Q-th time period by K4 time unit(s).

In one subembodiment, an expiration value of the first timer in a first time period in a following super-time period is smaller than an expiration value of the first timer in the Q-th time period.

In one subembodiment, an expiration value of the first timer in a first time period in a following super-time period is smaller than an expiration value of the first timer in the Q-th time period by K4 time unit(s).

In one embodiment, a time length indicated by the K4 time unit(s) is no greater than a duration of the Q time period in the super-time period and no greater than a duration of the first time period in the super-time period.

In one embodiment, K4 is 1.

In one embodiment, it is the network that configures a start/starts of at least one super-time period.

In one embodiment, any two adjacent super-time periods among the at least one super-time period are consecutive in time domain.

In one embodiment, a start of a first super-time period among the at least one super-time period is a time when DRX is configured.

In one embodiment, each super-time period among the at least one super-time period has an identical duration.

In one embodiment, it is the network that configures a number of time periods comprised by a super-time period.

In Embodiment 8, a super-time period comprises Q time periods, and the first bit block is received in an M-th time period, M being Q−1, the first bit block comprising any data type in a first data type set, durations of the first Q−1 time periods in the super-time period are identical, and are smaller than a duration of the Q-th time period.

In Case A of Embodiment 8, a start time of the first timer in the (Q−1)-th time period is a start of the (Q−1)-th time period, and a start time of the first timer in the Q-th time period is later than a start of the Q-th time period, namely, where a start time of the first timer in the Q-th time period is located in the Q-th time period is later than where a start time of the first timer in the (Q−1)-th time period is located in the (Q−1)-th time period, where an expiration value of the first timer in the Q-th time period is identical to an expiration value of the first timer in the (Q−1)-th time period.

In Case B of Embodiment 8, start times of the first timer in the (Q−1)-th time period and the Q-th time period are respectively a start of the (Q−1)-th time period and a start of the Q-th time period, where an expiration value of the first timer in the Q-th time period is greater than an expiration value of the first timer in the (Q−1)-th time period.

Embodiment 9

Figure 9:
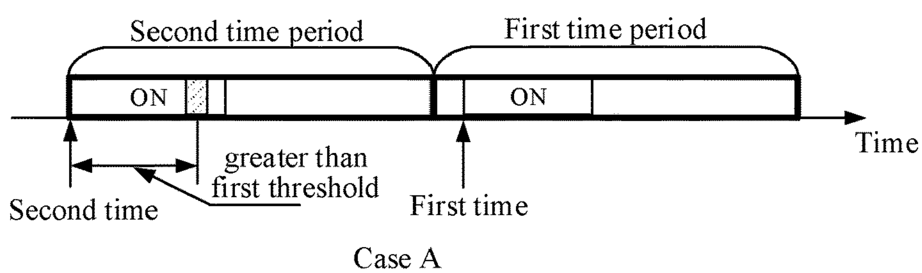
FIG. 9 illustrates another schematic diagram of adjusting the time while a first timer is running according to one embodiment of the present application.
Figure 9:
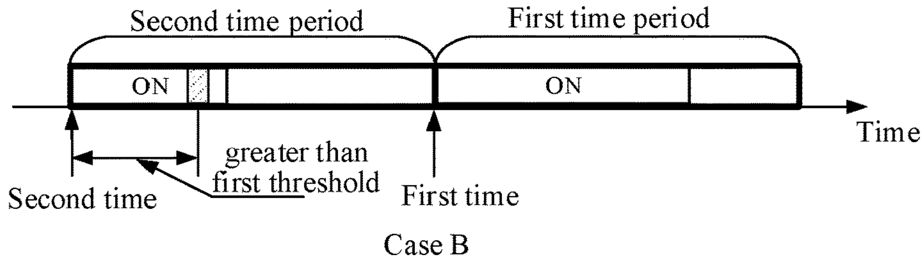

Embodiment 9 illustrates another schematic diagram of adjusting the time while a first timer is running according to one embodiment of the present application, as shown in FIG. 9. In FIG. 9, when the first timer is in a running state, the state is indicated by "ON"; a thick-line box represents a time period; the cross-filled box represents a first bit block.

In one embodiment, the first condition set comprises that a time interval from the time for receiving the first bit block to a start time of the first timer within a second time period is greater than a first threshold.

In one embodiment, the first condition set is comprised of two conditions, of which one is that the first bit block comprises any data type in a first data type set; the other condition is that the first condition set comprises that a time interval from the time for receiving the first bit block to a start time of the first timer within a second time period is greater than a first threshold.

In one embodiment, the first bit block is received during the time while the first timer is in a running state within the second time period.

In one embodiment, the first threshold is configurable.

In one embodiment, the first threshold is pre-configured.

In one embodiment, the first threshold is a times the size of a time length indicated by an expiration value of the first timer within the second time period.

In one embodiment, $\alpha$ is a positive number less than 1.

In one embodiment, $\alpha$ is $2/3$.

In one embodiment, $\alpha$ is $4/5$.

In one embodiment, $\alpha$ is $9/10$.

In one embodiment, the action of maintaining a first timer comprises starting the first timer at a first time in the first time period.

In one embodiment, the action of maintaining a first timer comprises starting the first timer at a second time in the second time period.

In one embodiment, the action of maintaining a first timer comprises that the first timer runs once in the first time period and once in the second time period.

In one embodiment, the second time period is a latest time period before the first time period.

In one embodiment, the first time period and the second time period are respectively the DRX cycles.

In one embodiment, a duration of the first time period is identical to a duration of the second time period.

In one embodiment, a duration of the first time period is different from a duration of the second time period.

In one embodiment, when the first bit block comprises any data type in a first data type set, and a time interval from the time for receiving the first bit block to a start time of the first timer within the second time period is greater than the first threshold, at least one of adjusting a position of the first time in the first time period to a position different from that of the second time in the second time period or adjusting a first expiration value to what is different from a second expiration value is done.

In one embodiment, when the first bit block comprises any data type in a first data type set, and a time interval from the time for receiving the first bit block to a start time of the first timer within the second time period is greater than the first threshold, adjusting a position of the first time in the first time period to a position different from that of the second time in the second time period is done.

In one embodiment, when the first bit block comprises any data type in a first data type set, and a time interval from the time for receiving the first bit block to a start time of the first timer within the second time period is greater than the first threshold, adjusting the first expiration value to what is different from the second expiration value is done.

In one embodiment, when the first bit block comprises any data type in a first data type set, and a time interval from the time for receiving the first bit block to a start time of the first timer within the second time period is greater than the first threshold, at least one of adjusting a position of the first time in the first time period to a position different from that of the second time in the second time period and adjusting the first expiration value to what is different from the second expiration value are done.

In one embodiment, when the first bit block comprises any data type in a first data type set, and a time interval from the time for receiving the first bit block to a start time of the first timer within the second time period is greater than the first threshold, a position of the first time in the first time period is adjusted to a temporal position obtained by adding a first offset duration to a position of the second time in the second time period.

In one embodiment, the first offset duration is no larger than a duration of the first time period.

In one embodiment, the first offset duration is configured by the network.

In one embodiment, the first offset duration is fixed.

In one embodiment, the first offset duration is half a time length indicated by the second expiration value.

In one embodiment, the first offset duration is a positive integral number of $1/32$ milliseconds, where the number is one of 1 through 31, inclusively.

In one embodiment, the first offset duration is no less than 1 ms.

In one embodiment, when the first bit block comprises any data type in a first data type set, and a time interval from the time for receiving the first bit block to a start time of the first timer within the second time period is greater than the first threshold, the first expiration value is adjusted to what is obtained by adding a second offset value to the second expiration value.

In one embodiment, the second offset value is configured by the network.

In one embodiment, the second offset value is fixed.

In one embodiment, the second offset value is rounding a quotient of the second expiration value being divided by 2 to an integer.

In one embodiment, the second offset value is a positive integer of 1 through 31, inclusively; herein, a time length indicated by the second offset value is the second offset value times $1/32$ ms.

In one embodiment, the second offset value is no less than 1; herein, a time length indicated by the second offset value is the second offset value ms.

In one embodiment, when the first bit block comprises any data type in a first data type set, and a time interval from the time for receiving the first bit block to a start time of the first timer within the second time period is greater than the first threshold, a time length indicated by the first expiration value is adjusted to a duration of the first time period; the first time is adjusted to a start of the first time period.

In one embodiment, the first time period is a first one among at least one time period.

In one embodiment, where a start time of the first timer in each time period of the at least one time period is located within the time period to which the first timer belongs is the same.

In one embodiment, an expiration value of the first timer in each time period of the at least one time period is identical to the first expiration value.

In one embodiment, the first expiration value is an expiration value of the first timer in the first time period.

In one embodiment, a time length indicated by the first expiration value is smaller than a duration of the first time period.

In one embodiment, the second expiration value is an expiration value of the first timer in the second time period.

In one embodiment, a time length indicated by the second expiration value is smaller than a duration of the second time period.

In Embodiment 9, the first bit block is received in a second time period, the first bit block comprising any data type in a first data type set, a duration of the first time period is identical to a duration of the second time period, and a time interval from the time for receiving the first bit block to a start time of the first timer in the second time period, i.e., a second time, is larger than the first threshold, the second time being a start of the second time period.

In Case A of Embodiment 9, a position of the first time in the first time period is later than a position of the second time in the second time period, the first expiration value and the second expiration value being identical.

In Case B of Embodiment 9, a position of the first time in the first time period is identical to a position of the second time in the second time period, namely, the first time is a start of the first time period, and the second time is a start of the second time period, the first expiration value being greater than the second expiration value.

In one embodiment, an expiration value of the first timer within the second time period is a positive integer of 1 through 31, inclusively; herein, a time length indicated by the first timer in the second time period is the expiration value times $\frac{1}{32}$ ms.

In one embodiment, the expiration value of the first timer within the second time period is no less than 1; herein, a time length indicated by the first timer in the second time period is the expiration value ms.

Embodiment 10

Figure 10:
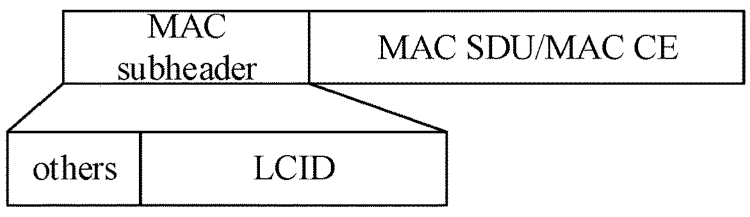
FIG. 10 illustrates a schematic diagram of a first bit block format according to one embodiment of the present application.

Embodiment 10 illustrates a schematic diagram of a first bit block format according to one embodiment of the present application, as shown in FIG. 10.

In one embodiment, the first bit block is a MAC subPDU, the MAC subPDU comprising one MAC subheader and one MAC SDU, or, the MAC subPDU comprising one MAC subheader and one MAC CE, where the MAC subheader comprises a LCID, the LCID indicating whether the first bit block comprises a data type in the first data type set; herein, the first identifier set comprises at least one logical channel identifier.

Embodiment 11

Figure 11:
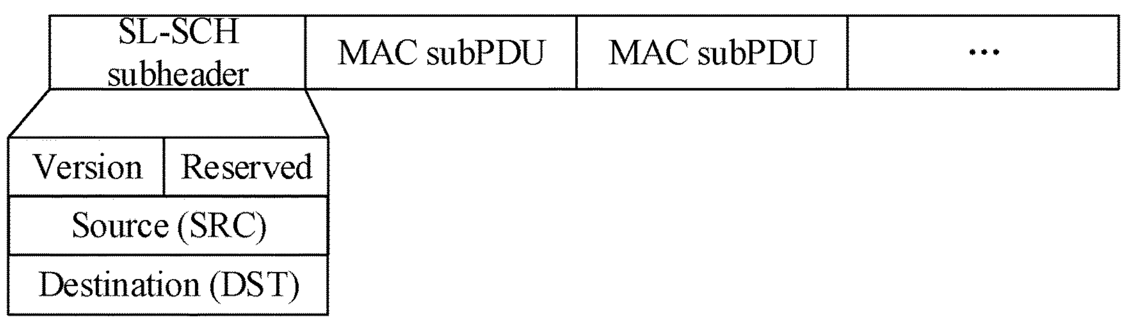
FIG. 11 illustrates another schematic diagram of a first bit block format according to one embodiment of the present application.

Embodiment 11 illustrates another schematic diagram of a first bit block format according to one embodiment of the present application, as shown in FIG. 11.

In one embodiment, the first bit block is a MAC PDU, the MAC PDU being transmitted via the sidelink, and the MAC PDU comprising one SideLink-Shared CHannel (SL-SCH) subheader and at least one MAC subPDU, the SL-SCH subheader comprising a SRC field and a DST field, where the SRC field comprises higher 16 bits of a source L2 identifier, while the DST field comprises higher 8 bits of a destination L2 identifier; a destination L2 identifier made up of 24 bits that consists of a DST field comprised by the first bit block and a DST field comprised by the first signaling indicates whether the first bit block comprises a data type in the first data type set; herein, the first identifier set comprises at least one destination L2 identifier.

Embodiment 12

Figure 12:
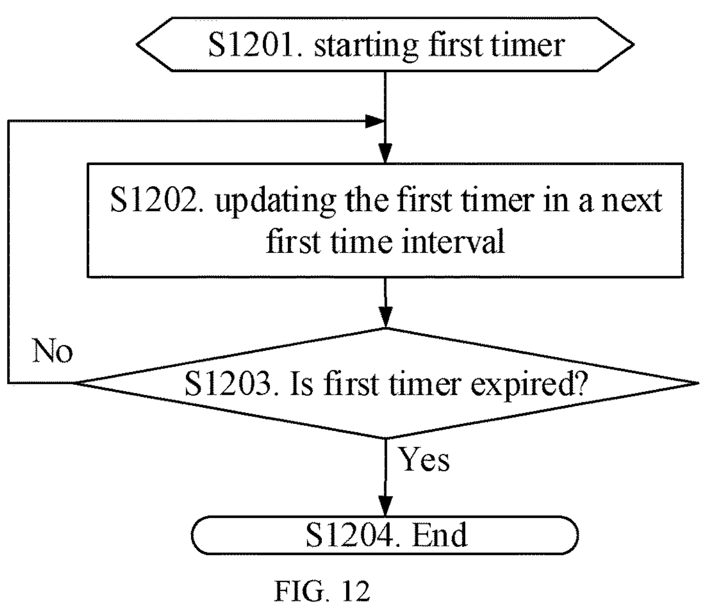
FIG. 12 illustrates a flowchart of running of a first timer according to one embodiment of the present application.

Embodiment 12 illustrates a flowchart of running of a first timer according to one embodiment of the present application, as shown in FIG. 12. The first timer is running in the first node.

In Embodiment 12, start a first timer in step S1201; in step S1202, the first timer is updated in a next first time interval; in step S1203, determine whether the first timer is expired, if so, come to an end, or if not, go back to step S1202.

In one embodiment, when the first timer is running, the first timer is updated per first time interval.

In one embodiment, when the first timer expires, stop the first timer.

In one embodiment, the first time interval is a duration indicated by a subframe.

In one embodiment, the first time interval is a duration indicated by a slot, where the relationship between the duration of the slot and a frequency-domain subcarrier spacing (SCS) satisfies the following: When the SCS=15 KHz×$2^{\mu}$, a duration of a corresponding slot=$\frac{1}{2}^{\mu}$ millisecond(s), where $\mu$=0, 1, 2, 3, 4, 5, 6.

In one embodiment, the first time interval is 1 millisecond (ms).

In one embodiment, the first time interval is $\frac{1}{32}$ ms.

In one embodiment, when starting a first timer, a value of the first timer is set to 0, and the phrase of updating the first timer is to increment the value of the first timer by 1; when the value of the first timer is an expiration value, the first timer is expired.

In one embodiment, when starting a first timer, a value of the first timer is set to an expiration value, and the phrase of updating the first timer is to decrement the value of the first timer by 1; when the value of the first timer is 0, the first timer is expired.

In one embodiment, when the first timer is running, the first node is in a state of Continuous Reception.

In one embodiment, the second timer is running in the first node; a running procedure of the second timer is identical to that of the first timer, hence no further details will be given here.

Embodiment 13

Figure 13:
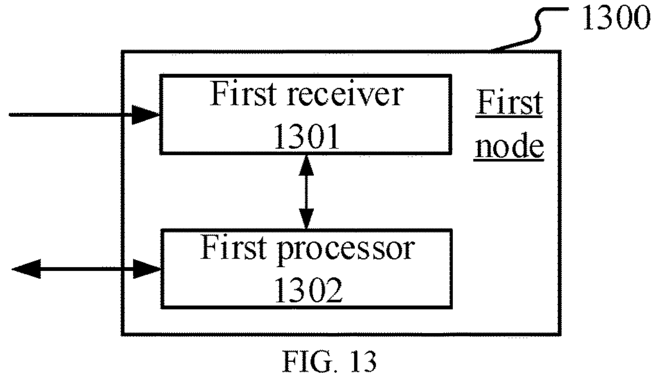
FIG. 13 illustrates a structure block diagram of a processing device in a first node according to one embodiment of the present application.

Embodiment 13 illustrates a structure block diagram of a processing device in a first node according to one embodiment of the present application, as shown in FIG. 13. In FIG. 13, a processing device 1300 in a first node comprises a first receiver 1301 and a first processor 1302; the first node 1300 is a UE.

In Embodiment 13, the first receiver 1301 receives a first signaling and a first bit block, the first signaling being used for scheduling the first bit block; the first processor 1302 maintains a first timer; and as a response to receiving the first signaling, starts or restarts a second timer; and when either of the first timer and the second timer is in a running state, monitors a first-type target signaling;

herein, the first timer and the second timer are configured for a same DRX group; the action of maintaining a first timer comprises adjusting the time while the first timer is running, and whether a reception of the first bit block is used for adjusting the time while the first timer is running is related to contents in the first bit block; when each condition in a first condition set is satisfied, the reception of the first bit block is used for adjusting the time while the first timer is running; the first bit block comprising any data type in a first data type set is a condition in the first condition set, the first data type set comprising at least one data type.

In one embodiment, the first receiver 1301 receives a second signaling, the second signaling indicating a first identifier set; herein, each identifier in the first identifier set indicates a data type in the first data type set.

In one embodiment, the phrase of adjusting the time while the first timer is running comprises at least one of adjusting a start time of the first timer or adjusting an expiration value of the first timer.

In one embodiment, whether a reception of the first bit block is used for adjusting the time while the first timer is running is related to the time for receiving the first bit block; herein, the time for receiving the first bit block belonging to one of an M-th time period or a Q-th time period in a super-time period is one condition in the first condition set; the super-time period comprises Q time periods, where the first M time period(s) among the Q time periods has/have an identical duration, which is different from duration(s) of the other Q-M time period(s) among the Q time periods; the first timer runs once per time period in a super-time period.

In one embodiment, whether a reception of the first bit block is used for adjusting the time while the first timer is running is related to the time for receiving the first bit block; herein, a time interval from the time for receiving the first bit block to a start time of the first timer in a second time period being larger than a first threshold is one condition in the first condition set.

In one embodiment, whether a reception of the first bit block is used for adjusting the time while the first timer is running is related to the time for receiving the first bit block; herein, a time interval from the time for receiving the first bit block to a start time of the first timer in a second time period being larger than a first threshold is one condition in the first condition set; the action of maintaining a first timer comprises starting the first timer at a first time in a first time period and starting the first timer at a second time in the second time period; herein, when the reception of the first bit block is used for adjusting the time while the first timer is running, at least one of adjusting a position of the first time in the first time period to where is different from a position of the second time in the second time period or adjusting a first expiration value to what is different from a second expiration value is done; the first expiration value is an expiration value of the first timer in the first time period; the second expiration value is an expiration value of the first timer in the second time period; the second time period is a latest time period before the first time period.

In one embodiment, the first timer is a drx-onduration-timer, while the second timer is a drx-inactivitytimer.

In one embodiment, the first receiver 1301 comprises the receiver 454 (comprising the antenna 452), the receiving processor 456, the multi-antenna receiving processor 458 and the controller/processor 459 in FIG. 4 of the present application.

In one embodiment, the first receiver 1301 comprises at least one of the receiver 454 (comprising the antenna 452), the receiving processor 456, the multi-antenna receiving processor 458 or the controller/processor 459 in FIG. 4 of the present application.

In one embodiment, the first receiver 1301 comprises the controller/processor 459 in FIG. 4 of the present application.

In one embodiment, the first processor 1302 comprises the receiver 454 (comprising the antenna 452), the receiving processor 456, the multi-antenna receiving processor 458 and the controller/processor 459 in FIG. 4 of the present application.

In one embodiment, the first processor 1302 comprises at least one of the receiver 454 (comprising the antenna 452), the receiving processor 456, the multi-antenna receiving processor 458 or the controller/processor 459 in FIG. 4 of the present application.

In one embodiment, the first processor 1302 comprises the transmitter 454 (comprising the antenna 452), the transmitting processor 468, the multi-antenna transmitting processor 457 and the controller/processor 459 in FIG. 4 of the present application.

In one embodiment, the first processor 1302 comprises at least one of the transmitter 454 (comprising the antenna 452), the transmitting processor 468, the multi-antenna transmitting processor 457 or the controller/processor 459 in FIG. 4 of the present application.

In one embodiment, the first processor 1302 comprises the controller/processor 459 in FIG. 4 of the present application.

Embodiment 14

Figure 14:
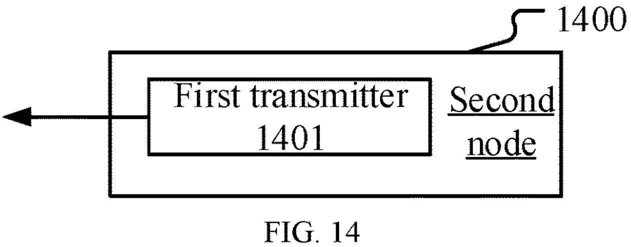
FIG. 14 illustrates a structure block diagram of a processing device in a second node according to one embodiment of the present application.

Embodiment 14 illustrates a structure block diagram of a processing device in a second node according to one embodiment of the present application, as shown in FIG. 14. In FIG. 14, a processing device 1400 in a second node comprises a first transmitter 1401; the second node 1400 is a base station.

In Embodiment 14, the first transmitter 1401 transmits a first signaling and a first bit block, the first signaling being used for scheduling the first bit block; herein, a first timer is maintained; a reception of the first signaling is used for starting or restarting a second timer; when any of the first timer or the second timer is in a running state, a first-type target signaling is being monitored; the first timer and the second timer are configured for a same DRX group; the first timer being maintained comprises the time while the first timer is running being adjusted, and whether a reception of the first bit block is used for adjusting the time while the first timer is running is related to contents in the first bit block; when each condition in a first condition set is satisfied, the reception of the first bit block is used for adjusting the time while the first timer is running; the first bit block comprising any data type in a first data type set is a condition in the first condition set, the first data type set comprising at least one data type; the first timer and the second timer are respectively maintained by a receiver of the first signaling.

In one embodiment, the first transmitter 1401 transmits a second signaling, the second signaling indicating a first identifier set; herein, each identifier in the first identifier set indicates a data type in the first data type set.

In one embodiment, the phrase of the time while the first timer is running being adjusted comprises at least one of a start time of the first timer being adjusted or an expiration value of the first timer being adjusted.

In one embodiment, whether a reception of the first bit block is used for adjusting the time while the first timer is running is related to the time for receiving the first bit block; herein, the time for receiving the first bit block belonging to one of an M-th time period or a Q-th time period in a super-time period is one condition in the first condition set; the super-time period comprises Q time periods, where the first M time period(s) among the Q time periods has/have an identical duration, which is different from duration(s) of the other Q-M time period(s) among the Q time periods; the first timer runs once per time period in a super-time period.

In one embodiment, whether a reception of the first bit block is used for adjusting the time while the first timer is running is related to the time for receiving the first bit block; herein, a time interval from the time for receiving the first bit block to a start time of the first timer in a second time period being larger than a first threshold is one condition in the first condition set.

In one embodiment, whether a reception of the first bit block is used for adjusting the time while the first timer is running is related to the time for receiving the first bit block; herein, a time interval from the time for receiving the first bit block to a start time of the first timer in a second time period being larger than a first threshold is one condition in the first condition set; the first timer being maintained comprises that the first timer is started at a first time in a first time period and that the first timer is started at a second time in the second time period; herein, when the reception of the first bit block is used for adjusting the time while the first timer is running, at least one of a position of the first time in the first time period being adjusted to where is different from a position of the second time in the second time period or a first expiration value being adjusted to what is different from a second expiration value is done; the first expiration value is an expiration value of the first timer in the first time period; the second expiration value is an expiration value of the first timer in the second time period; the second time period is a latest time period before the first time period.

In one embodiment, the first timer is a drx-ondurationtimer, while the second timer is a drx-inactivitytimer.

In one embodiment, the first transmitter 1401 comprises the transmitter 418 (comprising the antenna 420), the transmitting processor 416, the multi-antenna transmitting processor 471 and the controller/processor 475 in FIG. 4 of the present application.

In one embodiment, the first transmitter 1401 comprises at least one of the transmitter 418 (comprising the antenna 420), the transmitting processor 416, the multi-antenna transmitting processor 471 or the controller/processor 475 in FIG. 4 of the present application.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first-type communication node or UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The second-type communication node or base station or network-side device in the present application includes but is not limited to macro-cellular base stations, micro-cellular base stations, home base stations, relay base station, eNB, gNB, Transmitter Receiver Point (TRP), relay satellite, satellite base station, airborne base station and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE) for wireless communications, the UE comprising:

a transceiver; and a processor, wherein the transceiver and the processor are configured to:

receive a first signaling and a first bit block, wherein the first signaling is indicative of scheduling the first bit block, maintain a first timer, in response to receiving the first signaling, start or restart a second timer wherein the first timer and the second timer are configured for a same Discontinuous Reception (DRX) group, determine that each condition in a condition set is satisfied, wherein the condition set comprises a condition that a data type of a content in the first bit block belongs to a predetermined data type set, adjust, based on the content of the first bit block, a time of the first timer while the first timer is running, and when either of the first timer and the second timer is in a running state, monitor a first-type target signaling.

2. The UE according to claim 1, wherein the transceiver and the processor are further configured to:

receive a second signaling indicating an identifier set, wherein each identifier in the identifier set indicates a data type in the predetermined data type set.

3. The UE according to claim 1, wherein adjusting the time of the first timer while the first timer is running comprises at least one of:

adjusting a start time of the first timer, or adjusting an expiration value of the first timer.

4. The UE according to claim 1, wherein a time of receiving the first bit block belonging to one of an M-th time period or a Q-th time period in a super-time period is one condition in the condition set, and wherein the super-time period comprises Q time periods, and wherein the first M time period s among the Q time periods have an identical duration, which is different from duration s of the other Q-M time periods among the Q time periods, and wherein the first timer runs once per time period in a super-time period.

5. The UE according to claim 1, wherein a time interval from a time of receiving the first bit block to a start time of the first timer in a second time period is larger than a first threshold is one condition in the condition set.

6. The UE according to claim 5, wherein maintaining a first timer comprises starting the first timer at a first time in a first time period and starting the first timer at a second time in the second time period, and wherein when the reception of the first bit block is used for adjusting the time of the first timer while the first timer is running, at least one of adjusting a position of the first time in the first time period to where is different from a position of the second time in the second time period or adjusting a first expiration value to what is different from a second expiration value, and wherein the first expiration value is an expiration value of the first timer in the first time period, and wherein the second expiration value is an expiration value of the first timer in the second time period, and wherein the second time period is a nearest time period before the first time period.

7. The UE according to claim 1, wherein the first timer is a drx-ondurationtimer, and wherein the second timer is a drx-inactivitytimer.

8. A base station for wireless communications, the base station comprising:

a transceiver; and a processor, wherein the transceiver and the processor are further configured to:

transmit a first signaling and a first bit block, the first signaling being used for scheduling the first bit block, wherein:

a first timer is maintained, a reception of the first signaling is used for starting or restarting a second timer, when any of the first timer or the second timer is in a running state, a first-type target signaling is being monitored, the first timer and the second timer are configured for a same Discontinuous Reception (DRX) group, the first timer being maintained comprises the time while the first timer is running being adjusted, and whether the reception of the first bit block is used for adjusting the time while the first timer is running is related to contents in the first bit block, when each condition in a condition set is satisfied, the reception of the first bit block is used for adjusting the time while the first timer is running, the first bit block comprising any data type in a predetermined data type set is a condition in the condition set, the predetermined data type set comprising at least one data type, and the first timer and the second timer are respectively maintained by a receiver of the first signaling.

9. The base station according to claim 8, wherein the transceiver and the processor are further configured to:

transmit a second signaling, the second signaling indicating a first identifier set, wherein each identifier in the first identifier set indicates a data type in the predetermined data type set.

10. The base station according to claim 8, wherein adjusting the time while the first timer is running comprises at least one of:

a start time of the first timer being adjusted, or an expiration value of the first timer being adjusted.

11. The base station according to claim 8, wherein whether the reception of the first bit block is used for adjusting the time while the first timer is running is related to a time for receiving the first bit block, and wherein the time for receiving the first bit block belonging to one of an M-th time period or a Q-th time period in a super-time period is one condition in the condition set, and wherein the super-time period comprises Q time periods, where the first M time period s among the Q time periods have an identical duration, which is different from duration s of the other Q-M time periods among the Q time periods, and wherein the first timer runs once per time period in a super-time period.

12. The base station according to claim 8, wherein whether the reception of the first bit block is used for adjusting the time while the first timer is running is related to a time for receiving the first bit block, and wherein a time interval from the time for receiving the first bit block to a start time of the first timer in a second time period being larger than a first threshold is one condition in the condition set.

13. The base station according to claim 12, wherein maintaining the first timer comprises that the first timer is started at a first time in a first time period and that the first timer is started at a second time in the second time period, and wherein when the reception of the first bit block is used for adjusting the time while the first timer is running, at least one of a position of the first time in the first time period being adjusted to where is different from a position of the second time in the second time period or a first expiration value being adjusted to what is different from a second expiration value; the first expiration value is an expiration value of the first timer in the first time period, and wherein the second expiration value is an expiration value of the first timer in the second time period; the second time period is a nearest time period before the first time period.

14. The base station according to claim 8, wherein the first timer is a drx-ondurationtimer, and wherein the second timer is a drx-inactivitytimer.

15. A method in a user equipment (UE) for wireless communications, the method comprising:

receiving a first signaling and a first bit block, wherein the first signaling is indicative of scheduling the first bit block;

maintaining a first timer, in response to receiving the first signaling, starting or restarting a second timer, wherein the first timer and the second timer are configured for a same Discontinuous Reception (DRX) group;

determining that each condition in a condition set is satisfied, wherein the condition set comprises a condition that a data type of a content in the first bit block belongs to a predetermined data type set;

adjusting, based on the content of the first bit block, a time of the first timer while the first timer is running; and when either of the first timer and the second timer is in a running state, monitoring a first-type target signaling.

16. The method in the UE according to claim 15, further comprising:

receiving a second signaling indicating an identifier set, wherein each identifier in the identifier set indicates a data type in the predetermined data type set.

17. The method in the UE according to claim 15, wherein adjusting the time of the first timer while the first timer is running comprises at least one of:

adjusting a start time of the first timer, or adjusting an expiration value of the first timer.

18. The method in the UE according to claim 15, wherein a time of receiving the first bit block belonging to one of an M-th time period or a Q-th time period in a super-time period is one condition in the condition set, and wherein the super-time period comprises Q time periods, and wherein the first M time period s among the Q time periods have an identical duration, which is different from durations of the other Q-M time periods among the Q time periods, and wherein the first timer runs once per time period in a super-time period.

19. The method in the UE according to claim 15, wherein whether the reception of the first bit block is used for adjusting the time while the first timer is running is related to a time for receiving the first bit block;

wherein a time interval from the time for receiving the first bit block to a start time of the first timer in a second time period being larger than a first threshold is one condition in the condition set.

20. The method in the UE according to claim 19, wherein maintaining a first timer comprises starting the first timer at a first time in a first time period and starting the first timer at a second time in the second time period, and wherein when the reception of the first bit block is used for adjusting the time of the first timer while the first timer is running, at least one of adjusting a position of the first time in the first time period to where is different from a position of the second time in the second time period or adjusting a first expiration value to what is different from a second expiration value, and wherein the first expiration value is an expiration value of the first timer in the first time period and wherein the second expiration value is an expiration value of the first timer in the second time period, and wherein the second time period is a nearest time period before the first time period.

* * * * *